United States Patent
Okamoto

(10) Patent No.: US 6,854,062 B2
(45) Date of Patent: Feb. 8, 2005

(54) ELECTRONIC DEVICE AND COMMUNICATION METHOD USING BRIDGING MEDIUM

(75) Inventor: Chikashi Okamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 8 days.

(21) Appl. No.: 10/282,184

(22) Filed: Oct. 29, 2002

(65) Prior Publication Data

US 2003/0088662 A1 May 8, 2003

(30) Foreign Application Priority Data

Nov. 6, 2001 (JP) ........................................ 2001-340131

(51) Int. Cl.[7] ............................ G06F 11/30; H04L 9/00
(52) U.S. Cl. ...................... 713/200; 713/176; 709/206; 709/217; 709/232; 725/74
(58) Field of Search ................................ 713/200, 201; 709/206, 217, 218–219, 224, 229, 232; 348/6–8, 10, 12–13; 725/74, 78–82, 85; 370/252; 379/93.07

(56) References Cited

U.S. PATENT DOCUMENTS

| 6,192,410 B1 | 2/2001 | Miller et al. ................ 709/232 |
| 6,317,884 B1 | 11/2001 | Eames et al. ................ 709/217 |
| 2001/0005889 A1 * | 6/2001 | Albrecht ..................... 713/201 |
| 2002/0046249 A1 * | 4/2002 | Shiigi .......................... 709/206 |
| 2002/0066023 A1 * | 5/2002 | McIlroy ....................... 713/200 |
| 2002/0116637 A1 * | 8/2002 | Deitsch et al. .............. 713/201 |

FOREIGN PATENT DOCUMENTS

| JP | 2000-112848 | 4/2000 |
| WO | WO 01/09739 | 2/2001 |

OTHER PUBLICATIONS

"Residential LAN Architecture", Robert Olshansky et al., IEEE, 0–7803–27560X/95/$4.00, pp. 55–60.

* cited by examiner

Primary Examiner—Emmanuel L. Moise
(74) Attorney, Agent, or Firm—McDermott Will & Emery LLP

(57) ABSTRACT

To provide a system which, when data are incorporated into a household device via a bridging medium, is capable of ensuring security in the household device without installing security functions in the household device or bridging medium and regardless of whether the household device and a gateway in which security functions are integrated are connected via a network. The household device transfers data received via the bridging medium to the gateway, whereupon the security of the data is confirmed by security functions in the gateway. Only confirmed data are stored, whereupon a program or the like is executed. When the gateway and household device are not connected through a network, a signature is created in the gateway and this signature is verified in the household device.

2 Claims, 8 Drawing Sheets

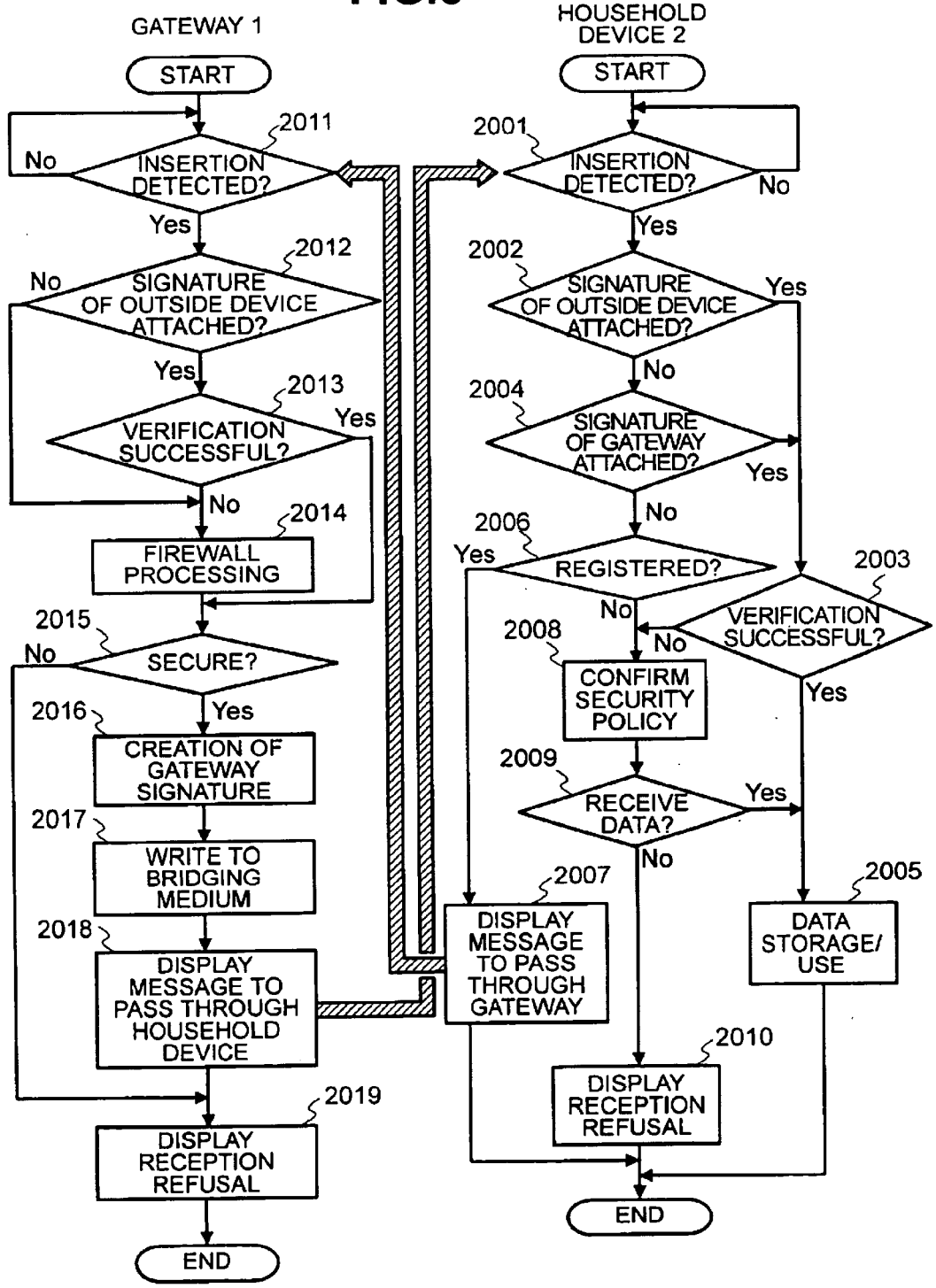

ELECTRONIC DEVICE AND COMMUNICATION METHOD USING BRIDGING MEDIUM

BACKGROUND

The present invention relates to an electronic device and a method of communication for performing communications securely using bridging medium.

Recently in communications between household electronic devices (referred to as "household devices" hereinbelow) and electronic devices on an outside network (referred to as "outside devices" hereinbelow), cables such as twist pair cable or USB cable are often used as means for connecting a household device to an outside network. In such cases, due to the labor and costs required for cable installation work into a household, application for a communication line and so on, individual household devices are not directly connected to an outside network, but rather a gateway alone is connected to the outside network. As a result, a form is taken in which individual household devices are connected to the outside network via a gateway.

Since data received by a household device invariably pass through the gateway, security functions such as a virus check function, encryption/validation function, and packet filtering function are integrated in the gateway, thereby lightening the function installation load on the individual household device.

In technology such as that described above, when the data of an outside device are stored in bridging medium, whereupon the bridging medium are brought into the household and the data in the bridging medium are stored in the household device, the data are stored in the household device without passing through a gateway. Thus, since the security functions of the gateway do not operate, communication cannot be performed securely. If, in this case, the security functions are installed in the individual household devices or bridging medium, this problem can be solved. In so doing, however, the cost of household devices and bridging medium increases and communication delays in the system occur.

SUMMARY

To solve the above problems, it is desired to provide a system which, when data are incorporated into a household device via bridging medium, is capable of maintaining security in the household device without installing security functions in the household device or bridging medium.

Here, "maintaining security" signifies prohibition of the use of insecure data, which includes not only data for which validation has not been obtained, data which have failed a validation check, or data which have not undergone a virus check, but also data which may cause an abnormal operation.

To provide the above system, a household device transfers data received via a bridging medium to a gateway, has the security of the data confirmed by the security function of the gateway, stores only data for which validation confirmation is complete, and executes a program or the like.

Furthermore, when the gateway and the household device are not connected by a network, a signature is created in the gateway and this signature is validated by the household device.

When this communication method is used, the data received by the household device passes through the gateway even when transferred from the bridging medium. Thus, by using the security function of the gateway, data can be confirmed as being secure without the need for installing security functions in the household device or bridging medium such that costs increases and communication delays are not incurred.

Additional objects, advantages and novel features of the embodiments will be set forth in part in the description which follows, and in part will become apparent to those skilled in the art upon examination of the following and the accompanying drawings or may be learned by production or operation of the embodiments. The objects and advantages of the inventive concepts may be realized and attained by means of the methodologies, instrumentalities and combinations particularly pointed out in the appended claims.

BRIEF DESCRIPTION OF THE DRAWINGS

The drawing figures depict preferred embodiments by way of example, not by way of limitations. In the figures, like reference numerals refer to the same or similar elements.

FIG. 8 is an exemplary flowchart for explaining schematically the operations of the gateway 1 and household device 2 in a second embodiment.

DETAILED DESCRIPTION OF THE EMBODIMENTS

Figure 1:
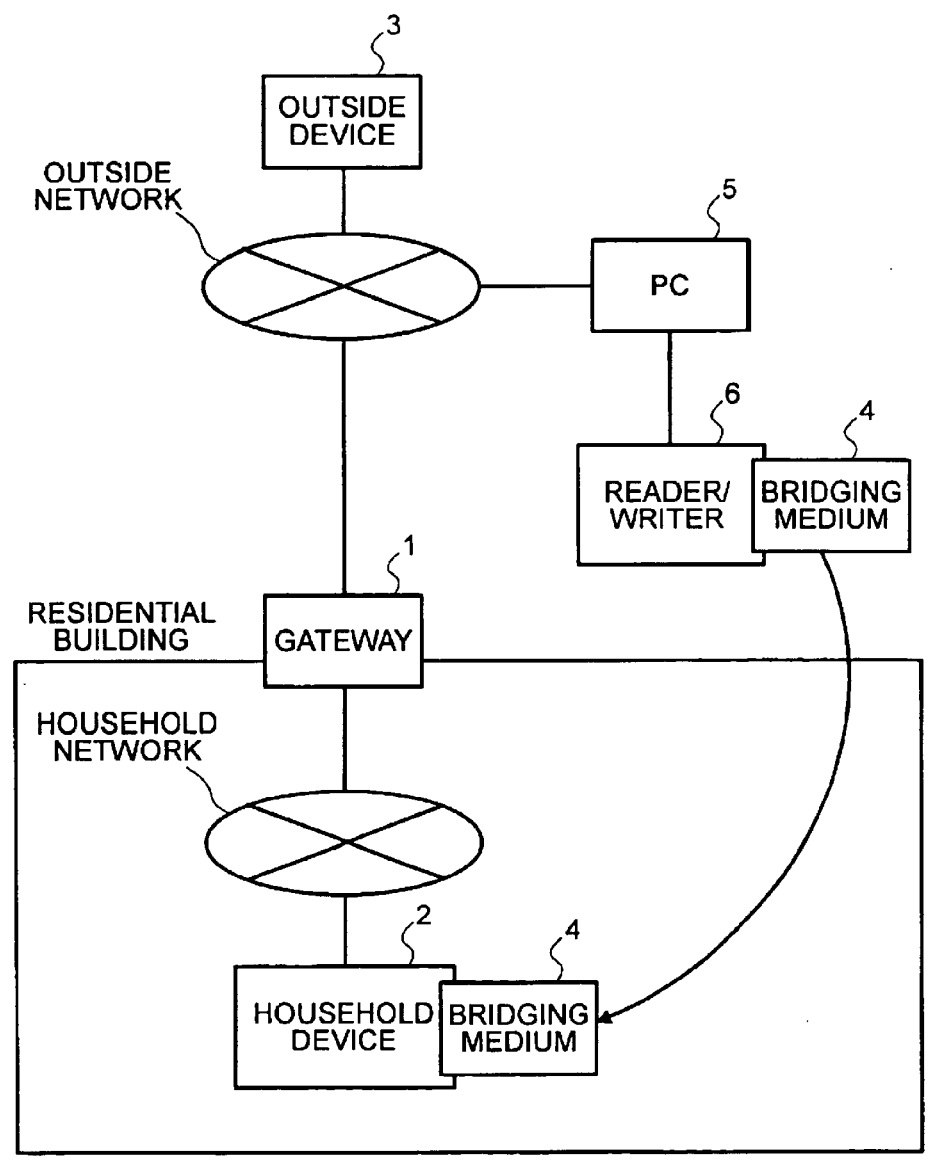
FIG. 1 is an exemplary schematic constitution of a communication system in a first embodiment.

Hereinafter, referring to the drawings, the explanation will be given below concerning the embodiments of the present invention.

A first embodiment will be described hereinbelow. First, the exemplary schematic constitution of a communication system of this embodiment will be described using FIG. 1.

In FIG. 1, numeral 1 is a gateway. The gateway 1 is positioned at the point of contact of a plurality of networks, and is a device for controlling communication among networks. In this embodiment, the gateway 1 is positioned between a household network inside a residential building and an outside network outside of the residential building so as to perform a role of maintaining the security of a household device connected to the household network against communication data from the outside network. The gateway has a function as a security-judging device.

Numeral 2 is a household device. The household device 2 is an electronic device inside a residential building which is connected to the gateway 1 via a household network. The household device 2 can read and use bridging medium data. The household device 2 may be, for example, a network-enabled microwave oven or the like. Numeral 3 is an outside device. The outside device 3 is an electronic device connected to an outside network. The outside device 3 may be, for example, a server of a service provider which supplies data such as recipes or programs to a network-enabled microwave oven. In this embodiment, security is maintained by assuming that the data supplied by the outside device are secure for use by the household device, and by ensuring that these data are uncorrupted. Numeral 4 is a bridging medium. The "bridging medium" is a storage device, carrier wave, or other means for exchange of data without insuring confirmation to established security protocols. The illustrated bridging medium 4 is for example, a portable memory, disk or tape which is used in the exchange of data among devices without the use of a network. The bridging medium 4 may be, for example, compact flash memory, a memory stick, PC card, floppy disk, MO disk, microdrive, magnetic tape, or similar. Numeral 5 is a PC. The PC 5 is connected to the outside device 3 via a network so as to be capable of downloading data from the outside device 3. The data which pass through the PC are not necessarily secure. Numeral 6 is a reader/writer of the bridging medium 4. The reader/writer 6 is connected to the PC 5 so as to write data received from the PC 5 to the bridging medium 4.

Note that in this embodiment, explanations will be given respectively of the household device 2 exemplified as a network-enabled microwave oven, of the outside device 3 exemplified as the server of a service provider for supplying data such as recipes or programs to the network-enabled microwave oven in affiliation with the manufacturer of the network-enabled microwave oven, and of the bridging medium 4 exemplified as compact flash memory. Furthermore, data supplied by a third party are not necessarily secure, unlike the data supplied by the service provider in affiliation with the manufacturer of the household device 2, and hence in this embodiment, the PC 5, rather than the outside device 3, will be dealt with as a server used in the supply of data from a third party.

Each apparatus constituting this communication system will now be described. Note, however, that the outside device 3, bridging medium 4, PC 5, and reader/writer 6 are commonplace devices, and hence explanation thereof has been omitted.

Figure 2:
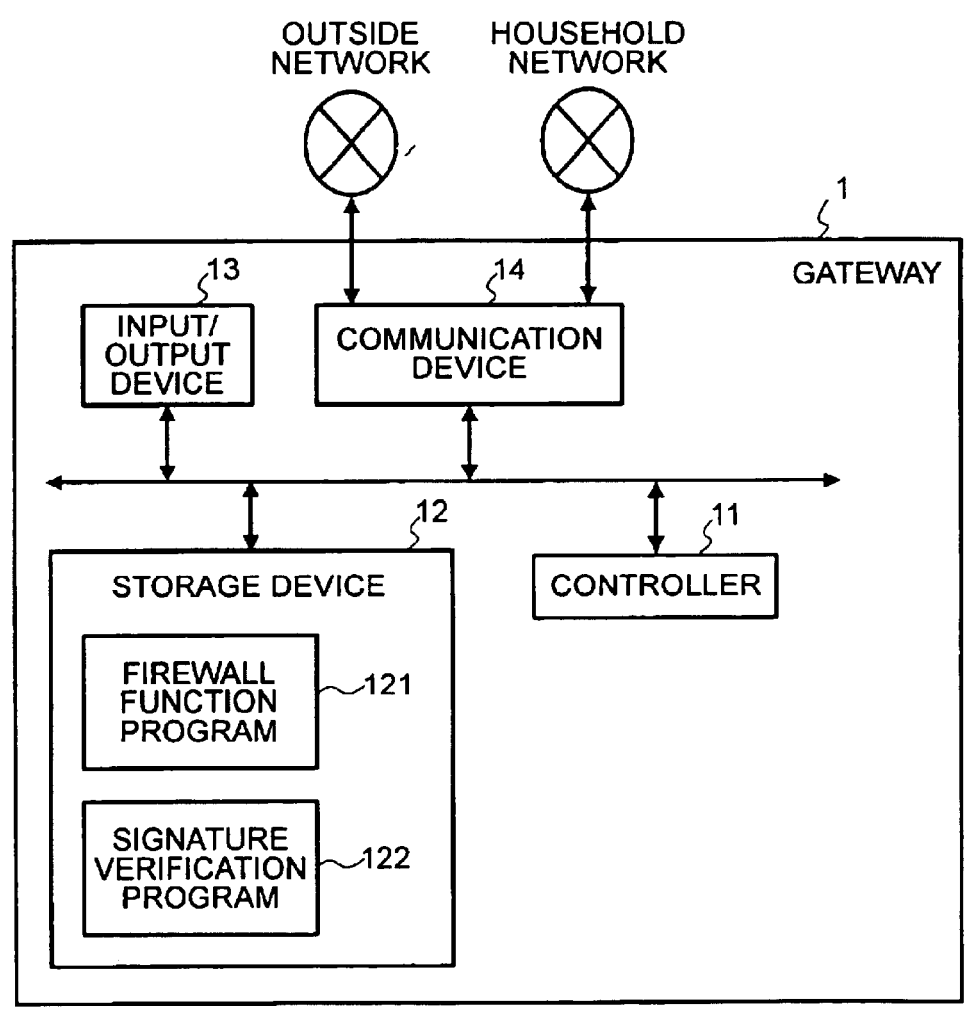
FIG. 2 is an exemplary schematic constitution of a gateway 1 in a first embodiment.

FIG. 2 is an exemplary schematic constitution of the gateway 1 of this embodiment. As is illustrated in FIG. 2, the gateway 1 of this embodiment comprises a controller 11, a storage device 12, an input/output device 13 and a communication device 14. The controller 11 controls the operations of the entire gateway 1. The storage device 12 is a gateway readable medium for storing various processing programs for controlling the operations of the entire gateway 1, various types of setting information inputted from the input/output device 13, various data received by the communication device 14, and so on. The storage device 12 may be, for example, memory, a disk, a tape, or similar.

The input/output device 13 is a device for displaying to a user setting information, the state of communication, guidance and so on, or causing the user to set same. The input/output device 13 may be, for example, a button, a switch, a remote control, a lamp, a display, or similar. The communication device 14 performs communication with another electronic device. In this embodiment, the communication device 14 performs communication with electronic devices on an outside network and a household network. The communication device 14, may be, for example, modem. The gateway 1 also stores firewall function program 121 and a signature verification program 122 in storage device 12. These programs are implemented by the controller 11. The firewall function program 121 is a program for firewall functions such as a virus check function, an encryption/validation function, or a packet filtering function. Data which are processed by executing the firewall function program 121 and judged thereby to be secure may be securely stored and executed in the household device 2.

The signature verification program 122 is a program for verifying the signature of the outside device 3. Verification of the digital signature of the outside device 3, which is attached to data, is performed using a public key included in an certificate of the outside device 3 which is attached in the same manner. Confirmations are made as to whether the data were generated by the outside device 3, whether the data have remained uncorrupted following the creation of the signature of the outside device 3, and so on.

Figure 3:
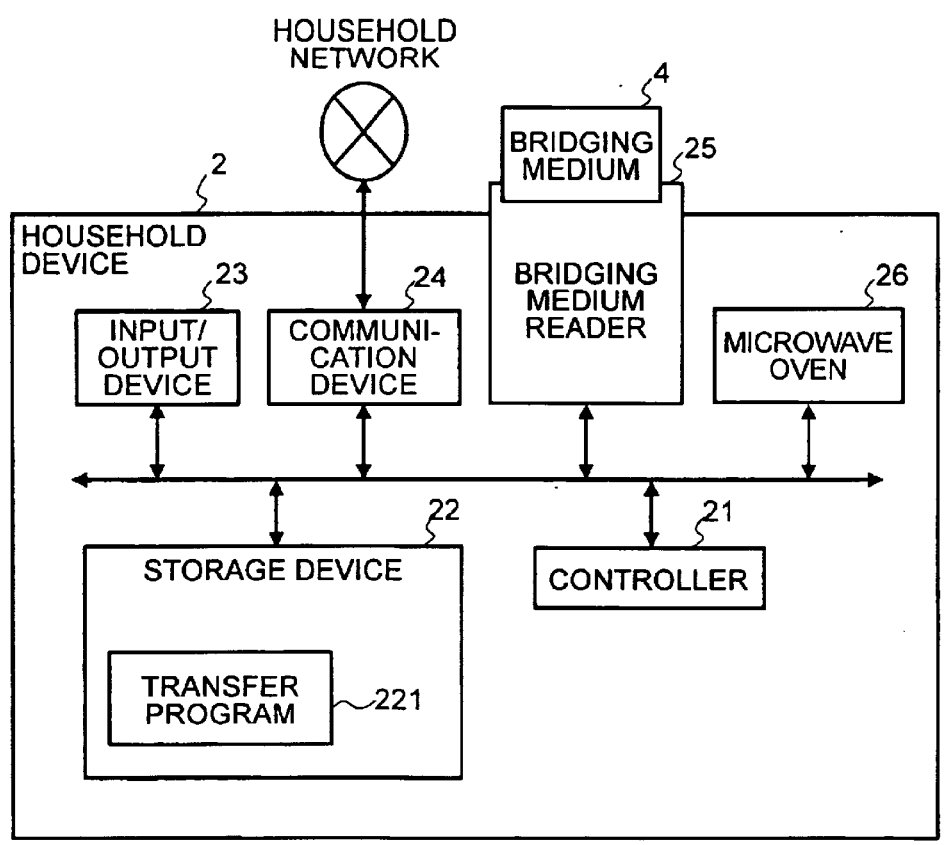
FIG. 3 is an exemplary the schematic constitution of a household device 2 in a first embodiment.

FIG. 3 is an exemplary schematic constitution of the household device 2 of this embodiment. As is illustrated in FIG. 3, the household device 2 of this embodiment comprises a controller 21, a storage device 22, an input/output device 23, a communication device 24, a bridging medium reader 25 and a microwave oven 26. Of course, those skilled in the art will recognize that the device 2 may embody any other intelligent household appliance, data communication device, or the like. For example, instead of microwave 26, if the device includes a TV, VCR, or DVD, data for program guide information or new function program would be provided from the outside of the household network; if the device includes a refrigerator, data for program of new cooling controlling method would be provided from the outside of the household network.

In the example, the controller 21 controls the operations of the entire household device 2. The storage device 22 household device readable medium for storing various processing programs for controlling the operations of the entire household device 2, setting information inputted from the input/output device 23, various data received by the communication device 24 or the bridging medium reader 25, and so on. The storage device 22 may be, for example, memory, a disk, a tape, or similar. The input/output device 23 is a device for displaying to a user setting information, the state of communication, guidance and so on, or causing the user to set same. The input/output device 23 may be, for example, a button, a switch, a remote control, a lamp, a display, or similar.

The communication device 24 communicates with another electronic device. In this embodiment, the communication device 24 performs communication with the gateway 1 via a household network. The media of the household network may comprise wires, optical cables, and/or any of variety of wireless links. The communication device 24 may be, example, modem, transceiver, or Bluetooth device.

The bridging medium reader 25 reads data stored in the bridging medium 4. The microwave oven 26 operates as a microwave oven. The household device 2 also stores a transfer program 221.

The transfer program 221 is a program for transferring data read from the bridging medium 4 by the bridging medium reader 25 to the gateway 1 via the communication device 24. The transfer program 221 in the storage device 22 is executed by the controller 21.

Figure 4:
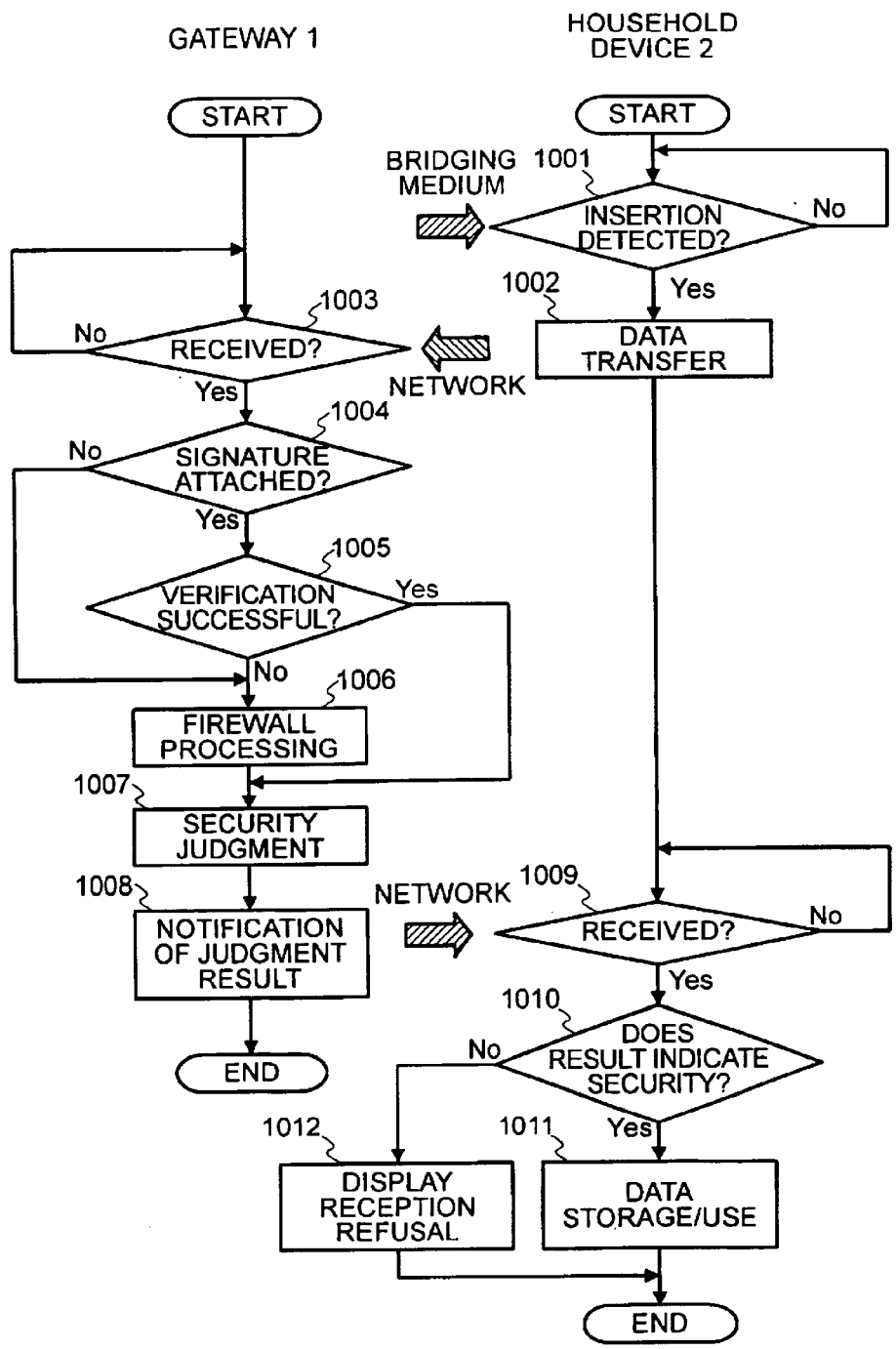
FIG. 4 is an exemplary flowchart for explaining schematically the operations of the gateway 1 and household device 2 in a first embodiment.

The operation of this communication system will now be described. FIG. 4 is a flowchart for explaining schematically the operations of the gateway 1 and the household device 2. It is assumed here that the PC 5 downloads data from the outside device 3, and that these data are stored in the bridging medium 4 using the reader/writer 6.

First, in the household device 2, the bridging medium 4 is detected to be inserted into the bridging medium reader 25 (YES in step 1001). Then, the bridging medium reader 25 reads the data stored in the bridging medium 4, whereupon the controller 21 transfers the read data to the gateway 1 via the communication device 24, by executing the transfer program 221. (step 1002).

Next, in the gateway 1, when the communication device 14 receives the data from the household device 2 (YES in step 1003), the controller 11 checks whether or not a signature is attached to the receive data (step 1004) according to the signature verification program 122. When a signature is attached (YES in step 1004), signature verification processing is performed using a public key included in a signature verification certificate (step 1005). The certificate itself may also be verified using the public key of a certifying authority. If a certificate is attached to the data along with the signature, that certificate is used. If a certificate is not attached to the data, then the signature verification program 122 acquires the certificate from the network certifying authority through the communication device 14. The public key of the certifying authority is also acquired from the network certifying authority by the signature verification program 122 via the communication device 14.

When no signature is attached to the receive data (NO in step 1004) or when signature verification fails (NO in step 1005), the firewall function program 121 performs firewall processing such as a virus check on the received data (step 1006), whereby a judgment is made as to whether or not the data is secure for use by the household device 2 (step 1007). When, for example, the data are a program for controlling the microwave oven 26 of the household device 2, if a description is included therein that will cause the microwave oven to operate so as to jeopardize the safety of nearby living things or to hinder the normal operation of nearby devices, then the data are judged insecure.

In the example, when signature verification is successful (YES in step 1005), the data are judged to be secure without performing firewall processing. However, firewall processing may be performed even when signature verification is successful. The communication device 14 sends notification of the judgment result as to the security of the data to the household device 2 (step 1008). These signature checking process (step 1004,1005) and firewall processing (step 1006) are executed for verification of security, therefore signature checking process and firewall processing examples of security verification processes. Here, when the judgment result indicates that the data are secure, the data that were subject to judgment may be sent as notification thereof.

Next, in the household device 2, the communication device 24 receives notification of the judgment result from the gateway 1 (step 1009). If the received notification of the judgment result indicates that the data are secure (YES in step 1010), the data read by the bridging medium reader 25 are stored in the storage device 22 and used by the controller 21 or the microwave oven 26 (step 1011). If the notification of the judgment result indicates that the data are insecure (NO in step 1010), a message is displayed indicating that data reception has been refused (step 1012).

According to this first embodiment, the gateway 1 and household device 2 are connected via a network such that even if the household device 2 reads data via the bridging medium 4, these data are transferred to the gateway 1. Further, the firewall function program 121 and signature verification program 122 of the gateway 1 take on the role of security functions. By these programs, when data are incorporated into the household device 2 via the bridging medium 4, the security of the household device 2 can be maintained without installing security functions in the household device 2 or bridging medium 4. Also according to this first embodiment, even if the number of signature verification keys that have to be managed increases due to an increase in the number of outside devices 3, only the gateway 1 need respond thereto, and therefore no load is placed on the household device 2.

A second embodiment will be described hereinbelow. This embodiment corresponds to a case in which the network connecting the household device 2 and the gateway 1 in the first embodiment is absent. Explanations hereinbelow which duplicate those of the first embodiment may be skipped.

Figure 5:
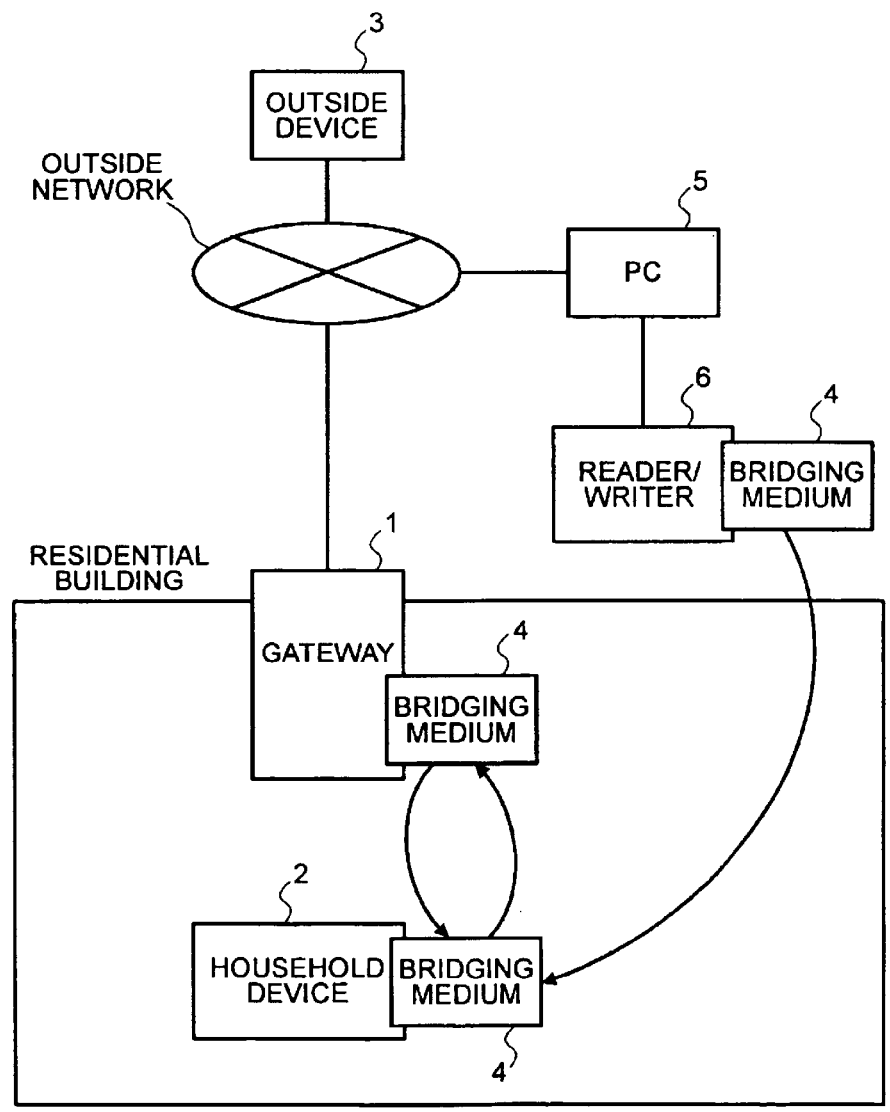
FIG. 5 is an exemplary schematic constitution of a communication system in a second embodiment.

First, the schematic constitution of the communication system of this embodiment will be described using FIG. 5. In FIG. 5, the gateway 1 can read and make use of data in the bridging medium 4. The gateway 1 and household device 2 are not connected via a network, and therefore data exchange between the gateway 1 and household device 2 is conducted via bridging medium 4. The constitution of the other parts of the system are identical to the first embodiment.

Figure 6:
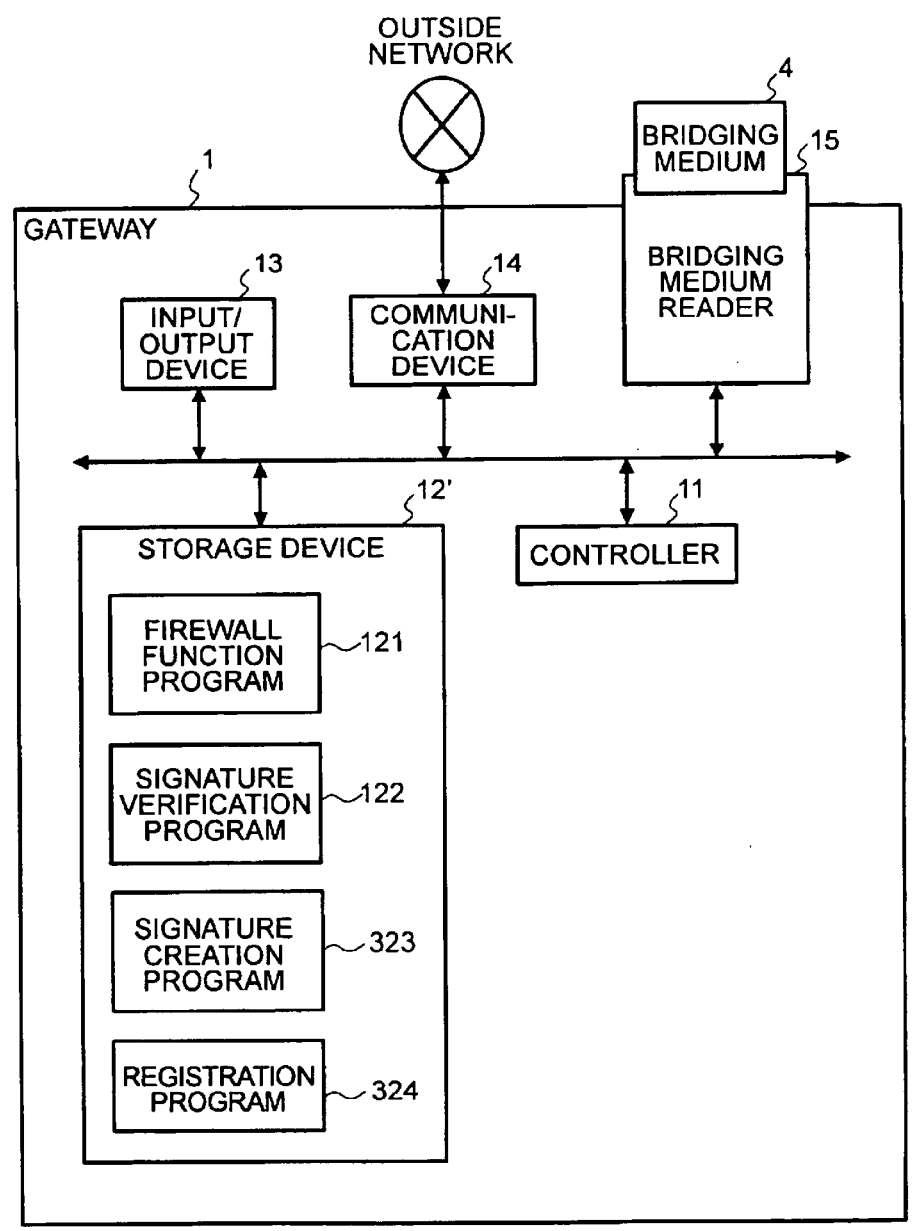
FIG. 6 is an exemplary schematic constitution of a gateway 1 in a second embodiment.

Each of the units constituting this communication system will now be described. FIG. 6 is a view showing the schematic constitution of the gateway 1 of this embodiment. As is illustrated in FIG. 6, the gateway 1 of this embodiment comprises a controller 11, a storage device 12', an input/output device 13, a communication device 14, and a bridging medium reader 15.

The storage device 12' a gateway readable medium for storing various processing programs for controlling the operation of the entire gateway 1, various types of setting information inputted from the input/output device 13, various data received by the communication device 14 or the bridging medium reader 15, and so on.

The communication device 14 communicates with another electronic device. In this embodiment, the communication device 14 conducts communication with an electronic device on an outside network.

The bridging medium reader 15 is a device for performing the reading and writing of data from and to the bridging medium 4.

The controller 11, input/output device 13, and bridging medium reader 15 are identical to those in the first embodiment.

The gateway 1 is also equipped with a firewall function program 121, a signature verification program 122, a signature creation program 323 and a registration program 324.

The signature creation program 323 is a program for creating a signature for the gateway 1 and attaching this signature to data which have been confirmed as secure by the firewall function program 121. The signature creation program 323 also performs the role of attaching a signature verification certificate to such data.

The registration program 324 is a program for registering the household device 2 which is managed by the gateway 1. An indication is made in the household device 2 which is subject to management and for which registration is complete that the signature verification certificate of the gateway 1 was passed thereto during registration.

The firewall function program 121 and signature verification program 122 are identical to those of the first embodiment.

A program for causing the gateway 1 to function as the firewall function program 121, signature verification program 122, signature creation program 323 and registration program 324 is stored in the storage device 12' and executed by the controller 11.

Figure 7:
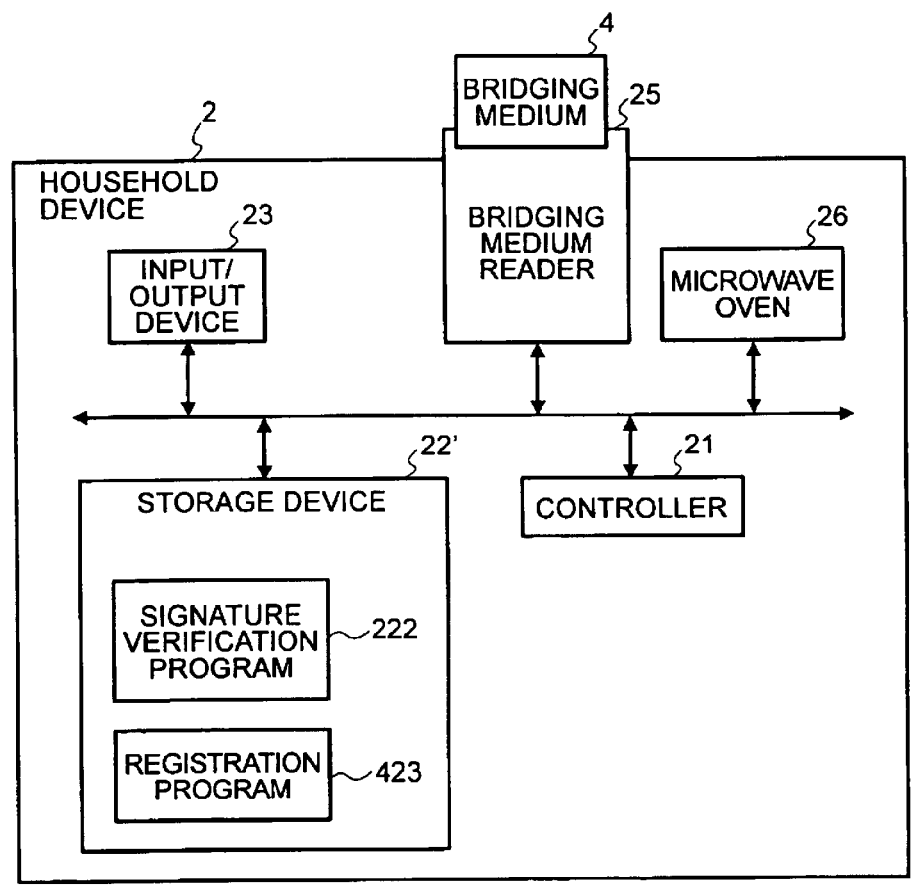
FIG. 7 is an exemplary schematic constitution of a household device 2 in a second embodiment.

FIG. 7 is a view showing the schematic constitution of the household device 2 of this embodiment. As is illustrated in FIG. 7, the household device 2 of this embodiment comprises a controller 21, a storage device 22', an input/output device 23, a bridging medium reader 25, and a microwave oven 26.

The storage device 22' is a household device readable medium for storing various processing programs for controlling the operations of the entire household device 2, setting information inputted from the input/output device 23, various data received by the bridging medium reader 25, and so on. The controller 21, input/output device 23, bridging medium reader 25, and microwave oven 26 are identical to those of the first embodiment. The household device 2 is also equipped with a signature verification program 222 and a registration program 423.

The signature verification program 222 is a program for verifying the signature of the gateway 1 or the outside device 3. A digital signature which is attached to data is verified using a public key included in a certificate which is attached thereto in the same manner, whereupon confirmations are made as to whether the data have been created by a legitimate party, whether the data have remained uncorrupted following the creation of the signature, and so on.

The registration program 423 is a program for performing registration of the gateway 1 which manages the household device 2. The security level is lowered to a limited extent, whereupon the signature verification certificate of the gateway 1 is received and stored.

A program for causing the household device 2 to function as the signature verification program 222 and the registration program 423 is stored in the storage device 22' and executed by the controller 21.

The operation of this communication system will now be described. FIG. 8 is a flowchart for explaining schematically the operations of the gateway 1 and household device 2. It is assumed here that the PC 5 downloads data from the outside device 3, and that these data are stored inside the bridging medium 4 using the reader/writer 6.

First, in the household device 2, the bridging medium 4 is detected to be inserted into the bridging medium reader 25 (YES in step 2001). Then, the bridging medium reader 25 reads the data stored in the bridging medium 4, whereupon the controller 11 checks whether or not the signature of the outside device 3 is attached to the receive data (step 2002), according to signature verification processing program 222. If the signature of the outside device 3 is attached (YES in step 2002), signature verification processing is performed using the public key of the outside device 3 (step 2003). The public key of the outside device 3 may be stored in the storage device 22' following creation thereof, or may be included in a certificate and attached to the data together with the signature. The certificate itself may also be verified using a public key of a certifying authority. The public key of the certifying authority may be stored in the storage device 22' following creation thereof.

If the signature of the signature verifying outside device 3 is not attached (NO in step 2002), a check is performed as to whether or not the signature of the gateway 1 is attached (step 2004). If the signature of the gateway 1 is attached (YES in step 2004), signature verification processing is performed using the public key of the gateway 1 (step 2003). The public key of the gateway 1 is acquired from the gateway 1 by the registration program 423 via the bridging medium 4 when the gateway 1 is registered to the household device 2, and may be stored in the storage device 22' or included in a certificate and attached to the data together with the signature. The certificate itself may also be verified using a public key of a certifying authority. The public key of the verifying authority may be stored in the storage device 22' following creation thereof or may be acquired from the gateway 1 during registration.

When signature verification of the outside device 3 or the gateway 1 is successful (YES in step 2003), the data are stored in the storage device 22' and used by the controller 21 or microwave oven 26 (step 2005).

When neither the signature of the outside device 3 nor the signature of the gateway 1 is attached to the data (NO in step 2004), an enquiry is made to the registration program 423 as to whether the gateway 1 is registered or not (step 2006). If the gateway 1 is registered (YES in step 2006), guidance is displayed to the user to insert the bridging medium 4 into the gateway 1 and have the gateway 1 confirm the security of the data (step 2007).

When signature verification fails (NO in step 2003) or when the gateway 1 is not registered (NO in step 2006), guidance is displayed to the user to confirm his/her security policy by selecting between registering the gateway 1 so as to confirm the security of the data or receiving the data in the bridging medium 4 without confirming the security thereof (step 2008). A security policy may be set in advance in the household device 2, whereby processing may proceed automatically without performing this display/confirmation procedure.

When the data are received (YES in step 2009), the data are stored in the storage device 22' and used by the controller 21 or microwave oven 26 (step 2005). When data are not received (NO in step 2009), a message is displayed indicating that data reception has been refused (step 2010).

The operation of the gateway 1 in response to the display in step 2007, after the user has inserted the bridging medium 4 into the bridging medium reader 15 of the gateway 1, will now be explained schematically.

First, notification is given that the bridging medium 4 has been inserted into the bridging medium reader 15 (YES in step 2011).

Next, the bridging medium reader 15 reads the data stored in the bridging medium 4, whereupon the signature verification program 122 checks whether the signature of the outside device 3 is attached to the receive data or not (step 2012). If the signature is attached (YES in step 2012), signature verification processing is performed using the public key included in the signature verification certificate (step 2013). The certificate itself may also be verified using the public key of the certifying authority. If the certificate is attached to the data together with the signature, then that certificate is used, and if the certificate is not attached to the data, the signature verification program 122 acquires a certificate from the network certifying authority via the communication device 14. The public key of the certifying authority is also acquired by the signature verification program 122 from the network certifying authority via the communication device 14.

When no signature is attached to the data (NO in step 2012) or when signature verification fails (NO in step 2013), the firewall function program 121 performs firewall processing such as a virus check on the data (step 2014), whereby a judgment is made as to whether or not the data is secure for use by the household device 2 (step 2015). When, for example, the data are a program for controlling the microwave oven 26 of the household device 2, if a description is included therein that will cause the microwave oven to operate so as to jeopardize the safety of nearby living things or hinder the normal operation of nearby devices, then the data are judged insecure.

When signature verification is successful (YES in step 2013), the data are judged to be secure without performing firewall processing. However, firewall processing may be performed even when signature verification is successful.

When the data are judged insecure (NO in step 2015), the input/output device 13 displays a message indicating that data reception has been refused (step 2019).

If the data are judged secure (YES in step 2015), the signature creation program 323 creates a signature for the data using a secret key of the gateway 1 and attaches this signature to the data together with a certificate (step 2016). Here, when the signature of the outside device 3 has been attached to the data in step 2012, a signature of the gateway 1 is created in respect of both the data and of the signature of the outside device 3.

Next, the data are written to the bridging medium 4 via the bridging medium reader 15 (step 2017), whereupon the input/output device 13 displays guidance to the user to insert the bridging medium 4 into the household device 2 (step 2018).

Thereafter, once the user has inserted the bridging medium 4 into the bridging medium reader 25 of the household device 2 in accordance with the display of step 2018, operations are performed in accordance with the flowchart from step 2001 onward.

If, in the initial step of the series of operations, the user inserts the bridging medium 4 into the bridging medium reader 15 of the gateway 1 rather than into the bridging medium reader 25 of the household device 2, operations are performed in accordance with the flowchart from step 2011 onward.

In the second embodiment, an explanation was given in which the bridging medium reader 15 is installed in the gateway 1. However, the bridging medium reader 15 may be provided separately to the gateway 1 and used as an external device.

According to this second embodiment, even when the household device 2 reads data via the bridging medium 4, the user is prompted to maintain security by having the gateway 1 read these data in advance. Further, an electronic signature of the gateway 1 is attached to the data following confirmation of the security of the data by the gateway 1, and thus even if data are uncorrupted following security confirmation, this can be detected. Further, a firewall function program 121 and signature verification program 122 of the gateway 1 perform as security functions. By the above programs, when data are incorporated into the household device 2 via the bridging medium 4, the security of the household device 2 can be maintained simply by installing a signature verification function in the household device 2 without the need to install high-level security functions in the household device 2 or bridging medium 4. Also according to this second embodiment, even if the number of signature verification keys that have to be managed increases due to an increase in the number of outside devices 3, only the gateway 1 need respond thereto, and therefore no load is placed on the household device 2.

Also according to this second embodiment, the gateway 1 and household device 2 are not connected by a network, and therefore time is necessary to reinsert the bridging medium 4 during the transfer of data between the gateway 1 and the household device 2. Hence, even though signature verification processing in the household device 2 takes time, the time necessary for signature verification processing is a small proportion of the overall processing time, and thus there is no need to install a signature verification function capable of high-speed processing in the household device 2.

Further, according to this second embodiment, when the signature of the outside device 3 is attached to the data, a signature of the gateway 1 is created in respect of the data and the signature of the outside device 3 and attached thereto. Thus, data for which security has been confirmed once by the gateway 1 can undergo similar security confirmation in another gateway.

In the first and second embodiments, the schematic constitution of the gateway 1 and the household device 2 were described focusing on the specific states of connection illustrated in FIGS. 1 and 5 respectively. However, a gateway 1 and household device 2 having a constitution which is a combination of the constitutions of the first and second embodiments may be used in order to correspond to the states of connection of both the first and second embodiments.

Also in the embodiments, a case in which data are incorporated into the household device 2 via the bridging medium 4 was explained as an example. However, the embodiments are not only applicable to the tangible medium like a portable memory, disk or tape which is used in the exchange of data among devices without the use of a network, but to any system having means which are capable of transferring data to the household device 2 without passing through the gateway 1. For example, data may be transferred to the household device 2 without passing through the gateway 1 using Bluetooth communication, infrared communication, or similar. In this case, the bridging medium can also take the form of electric or electromagnetic signals, or light waves such as those generated during radio frequency (RF) and infrared (IR) data communications such as those generated during radio frequency (RF) and infrared (IR) data communications.

Also in the embodiments, the PC 5 is used as an electronic device for downloading data from the outside device 3 so as to write these data in the bridging medium 4 through the reader/writer 6. However, the PC 5 may be any other electronic device that is capable of downloading data from the outside device 3 so as to write these data in the bridging medium 4 through the reader/writer 6, for example a portable telephone, PDA or the like.

In the embodiments, the PC 5 and reader/writer 6 were explained separately. However, a single device such as a PC 5 having a reader/writer function may be used. In the embodiments, the outside device 3 and PC 5 were also explained separately, but a single device may be used. In this case, the reader/writer 6 is connected to the outside device 3 such that data are written to the bridging medium 4 without passing through the network or PC 5. In the embodiments, a network-enabled microwave oven was described as an example of the household device 2. However not only a network-enabled microwave oven but any electronic device which can exchange data with the gateway 1 via a network, bridging medium or another route, and which can read and make use of data in a bridging medium 4 is acceptable.

In the embodiments, networks and devices are separated into "household" and "outside" with a residential building as a reference. However, a region in which security can be maintained and a region in which security cannot be maintained may be designated respectively as "household" and "outside". If, for example, a server for confirming the security of data is designated as the gateway 1, an electronic device which is capable of secure communication with the gateway 1 is designated as the household device 2, and an electronic device which is connected to a network on a different side of the gateway 1 to the household device 2 is designated as the outside device 3, the gateway 1, household device 2 and outside device 3 may all be outside.

As explained above, a mechanism is provided which, when data are incorporated into the household device 2 via the bridging medium 4, is capable of maintaining security in the household device 2 without installing security functions in the household device 2 or bridging medium 4 and regardless of whether the household device 2 and gateway 1 in which security functions are integrated are connected by a network.

In the above embodiments, programs are stored in storage device 12, 12' as a gateway readable medium, or storage device 22, 22' as a household device readable medium. Terms relating to gateway or device "readable medium" as used herein refer to any medium that participates in providing instructions and/or data to a controller for execution or other processing. Such a medium may take many forms, including but not limited to, non-volatile media, volatile media, and transmission media. Non-volatile media include, for example, optical or magnetic disks, such as ROM, or Hard disc. Volatile media include dynamic memory, such as RAM described. Physical transmission media include coaxial cables; copper wire and fiber optics. Transmission media can also take the form of electric or electromagnetic signals, or acoustic or light waves such as those generated during radio frequency (RF) and infrared (IR) data communications.

Common forms of device (device, e.g., household device, and gateway) readable media include, for example, a flexible disk, hard disk, magnetic medium, a CD-ROM, DVD, any other optical medium, RAM, a PROM, and EPROM, a FLASH-EPROM, any other memory chip or cartridge, a carrier gave transporting data or instructions, or any other medium for which an information terminal device can read. Various forms of machine-readable media may be involved in carrying one or more sequences of one or more instructions to controller 11 of 21 for execution. Incidentally, the softwares refer to the programs for the operations of the computer.

While the foregoing has described what are considered to be the best mode and/or other preferred embodiments, it is understood that various modifications may be made therein and that the invention or inventions disclosed herein may be implemented in various forms and embodiments, and that they may be applied in numerous applications, only some of which have been described herein. It is intended by the following claims to claim any and all modifications and variations that fall within the true scope of the inventive concepts.

What is claimed is:

1. A communication method in a household system, the household system comprised by an electronic device which reads data from a bridging medium and a security-judging device which performs firewall processing on the data in order to make a judgment as to the security of the data, the electronic device independent from any network to communicate with the security-judging device, comprising the steps of:

reading, at the electronic device, data from the bridging medium;

at the electronic device, checking for an electronic signature created by a reliable data provider attached to the data;

at the electronic device, using the data if the data has the electronic signature created by the reliable data provider;

at the electronic device, checking for an electronic signature created by the security-judging device attached to the data;

at the electronic device, using the data if the data has electronic signature created by the security-judging device;

displaying, at the electronic device, a message to a user to have the security-judging device read the data in the bridging medium when neither the electronic signature created by a reliable data provider nor the electronic signature created by the security-judging device is attached to the data;

reading, at the security-judging device, the data from the bridging medium;

performing, at the security-judging device, firewall processing on the data to make a judgment as to the security of the data;

displaying, at the security-judging device, a message to the user indicating that the data cannot be used when the judgment result indicates that the data are not secure;

creating, at the security-judging device, an electronic signature for the data to attach to the data in the bridging medium when the judgment result indicates that the data are secure; and displaying, at the security-judging device, a message to the user to have the electronic device using bridging medium read the secure data from the bridging medium.

2. The communication method according to claim 1, further comprising:

checking, at the electronic device, whether or not the security-judging device is registered when the electronic signature created by the reliable data provider is not attached to data from the bridging medium and when the checking for the electronic signature by created by the reliable data provider fails;

displaying, at the electronic device, a message to prompt the user to have the security-judging device read the data in the bridging medium when the security-judging device is registered; and displaying, at the electronic device, a message to the user indicating that the data cannot be used when the security-judging device is not registered.

* * * * *